United States Patent [19]

Cheng et al.

[11] Patent Number: 5,367,675
[45] Date of Patent: Nov. 22, 1994

[54] COMPUTER AUTOMATED SYSTEM AND METHOD FOR OPTIMIZING THE PROCESSING OF A QUERY IN A RELATIONAL DATABASE SYSTEM BY MERGING SUBQUERIES WITH THE QUERY

[75] Inventors: Josephine M.-K. Cheng, San Jose; Sheldon J. Finkelstein, Saratoga; Donald J. Haderle, Los Gatos; Mir H. Pirahesh, San Jose; Yun Wang, Sunnyvale, all of Calif.

[73] Assignee: International Business Machines Corporation, Armonk, N.Y.

[21] Appl. No.: 807,281

[22] Filed: Dec. 13, 1991

[51] Int. Cl.$^5$ ............................................. G06F 15/403
[52] U.S. Cl. ............................. 395/600; 364/DIG. 1; 364/283.4
[58] Field of Search ........................................ 395/600

[56] References Cited

U.S. PATENT DOCUMENTS

| | | | |
|---|---|---|---|
| 4,769,772 | 9/1989 | Dwyer | 395/600 |
| 4,829,427 | 5/1989 | Green | 395/600 |
| 5,091,852 | 2/1992 | Tsuchida et al. | 395/600 |
| 5,239,663 | 8/1993 | Faudemay | 395/800 |

OTHER PUBLICATIONS

M. Astrahan et al., "System R", System R: Relational Approach to Database Management, ACM Transactions on Database Systems, Jun. 1986, pp. 97–137.

P. Selinger, et al., "Access Path Selection in a Relational Database Management System," Jun. 1979, Proc. ACM SIGMOD.

R. Ganski, et al., "Optimization of Nested SQL Queries Revisited," 1987 Proc. of ACM SIGMOD Conference.

W. Kim, "On Optimizing an SQL-like Nested Query," Sep. 1982, vol. 7:3, ACM Transactions on Database Systems.

O. Anfindsen, "A Study of Access Path Selection in DB2" Norwegian Telecommunications Administration and University of Oslo, Norway.

L. Haas, et. al., "Extensible Query Processing in Starburst," 1989 ACM 0-89791-317-/5/89/0005/0377.

*Primary Examiner*—Paul V. Kulik
*Assistant Examiner*—John C. Loomis
*Attorney, Agent, or Firm*—Esther E. Klein

[57] ABSTRACT

An automated method is provided for optimizing a query for retrieving data from a relational database in a computer relational database management system. The method uses rules for identifying queries for which duplicates are a factor in retrieving the proper data from the database. The method then merges queries with table expressions, views and subqueries when possible without causing duplicates to be unnecessarily retrieved.

18 Claims, 5 Drawing Sheets

```
┌132         ┌134  ┌136
 SELECT DISTINCT EMPNO, SALARY FROM SB.EMPLOYEE
             ┌138
 ***** NEW SQL STATEMENT ****
 SELECT ALL Q3.EMPNO, Q3.SALARY
    FROM SB.EMPLOYEE Q3
 **************************
```

FIG. 3

```
┌152
 CREATE VIEW V2(EMPNO , WORKDEPT )
    AS  ┌156  ┌154       ┌158
    (SELECT DISTINCT Q4.EMPNO, Q4.WORKDEPT
     FROM SB.EMPLOYEE Q4  ─160
150  WHERE Q4.SALARY<20000);

SELECT * FROM SB.V2, SB.DEPARTMENT
    WHERE V2.WORKDEPT = DEPARTMENT.DEPTNO

***** INTERIM SQL STATEMENT ****
    SELECT ALL Q5.DEPTNO, Q5.DEPTNAME, Q5.MGRNO, Q5.ADMRDEPT, Q3.EMPNO,
       Q3.WORKDEPT
       FROM SB.DEPARTMENT Q5,
          $DERIVED.T4(EMPNO , WORKDEPT )
          AS
          (SELECT DISTINCT Q4.EMPNO, Q4.WORKDEPT
          FROM SB.EMPLOYEE Q4
          WHERE Q4.SALARY<20000
          ) Q3
       WHERE Q3.WORKDEPT=Q5.DEPTNO

170  ***** NEW SQL STATEMENT ****
     SELECT ALL Q4.DEPTNO, Q4.DEPTNAME, Q4.MRGNO, Q4.ADMRDEPT, Q3.EMPNO,
        Q3.WORKDEPT
        FROM SB.EMPLOYEE Q3, SB.DEPARTMENT Q4
        WHERE Q3.SALARY<20000
        AND Q3.WORKDEPT=Q4.DEPTNO
     **************************
```

FIG. 4

184 — CREATE VIEW sb.richemps AS
        (SELECT DISTINCT empno, salary, workdept FROM sb.employee
        WHERE salary > 50000);
    SELECT mgrno FROM sb.department                           182
180 → WHERE NOT(EXISTS( (SELECT 1 FROM sb.richemps, sb.project
                WHERE project.deptno = richemps.workdept
                AND richemps.workdept = department.deptno), \*\*\*\*\* INTERIM SQL STATEMENT \*\*\*\*
SELECT ALL Q3.MGRNO
FROM SB.DEPARTMENT Q3
WHERE SYSTEM.NOT EXISTS
  (
    SELECT ALL 1
      FROM SB. PROJECT Q7,
        $DERIVED.T6(EMPNO , SALARY INTEGER, WORKDEPT          ) AS
        (SELECT DISTINCT Q6.EMPNO, Q6.SALARY, Q6.WORKDEPT
        FROM SB.EMPLOYEE
        WHERE Q6.SALARY>50000
        ) Q5
    WHERE (Q7.DEPTNO=Q5.WORKDEPT)AND(Q5.WORKDEPT=Q3.DEPTNO)
  )

190 — \*\*\*\*\* NEW SQL STATEMENT \*\*\*\*
SELECT ALL Q3.MGRNO
    FROM SB.DEPARTMENT Q3
    WHERE SYSTEM.NOT EXISTS
        (SELECT DISTINCT 1, Q6.$C254, Q5.EMPNO, Q5.SALARY, Q5.WORKDEPT
          FROM SB.EMPLOYEE Q5, SB.PROJECT Q6
            WHERE Q5.SALARY>50000 AND Q5.WORKDEPT=Q3.DEPTNO
              AND Q6.DEPTNO=Q5.WORKDEPT
        )
    )
\*\*\*\*\*\*\*\*\*\*\*\*\*\*\*\*\*\*\*\*\*\*\*\*\*\*\*\*\*

*FIG. 5*

202
↳ CREATE VIEW V10 AS
   (SELECT DISTINCT EMP.SALARY, EMP.WORKDEPT FROM SB.EMPLOYEE EMP)
200
↳ SELECT department.deptno, mgr.lastname, v10.salary
   FROM sb.department, sb.employee mgr, v10
   WHERE department.mgrno = mgr.empno and
      department.deptno = v10.workdept;                                    /210
212   *** NEW SQL STATEMENT **
↳ SELECT DISTINCT Q4.DEPTNO, Q3.LASTNAME, Q5.SALARY, V10.SALARY Q3.$C254
   FROM SB.EMPLOYEE Q5, SB.EMPLOYEE Q3, SB.DEPARTMENT Q4
   WHERE Q4.MGRNO=Q3.EMPNO AND Q5.WORKDEPARTMENT=Q4.DEPTNO
****************************   FIG. 6

SELECT department.deptno, mgr.empno
FROM sb.department, sb.employee mgr
   WHERE department.mgrno = mgr.empno
      AND EXISTS (select emp.salary from sb.employee emp
            where mgr.workdept = emp.workdept),
         mgr.salary < temp.salary);
*** INTERIM SQL STATEMENT **
SELECT DINSTINCT Q4.DEPTNO, Q3.EMPNO
   FROM SB.EMPLOYEE Q3, SB.DEPARTMENT Q4,
      $DERIVED.T1($CO INTEGER)
         AS
         (SELECT Q5.SALARY
          FROM SB.EMPLOYEE Q5
          WHERE Q3.WORKDEPT=Q5.WORKDEPT) Q6,
      WHERE Q3.SALARY < Q6.$CO
         AND Q4.MGRNO=Q3.EMPNO
SELECT department.deptno, mgr.empno
FROM sb.department, sb.employee mgr
   WHERE department.mgrno = mgr.empno
      AND EXISTS ((TABREF) temp as (select emp.salary from sb.employee emp
            where mgr.workdept = emp.workdept),
         mgr.salary < temp.salary);
*** NEW SQL STATEMENT **
SELECT DINSTINCT Q4.DEPTNO, Q3.EMPNO
   FROM SB.EMPLOYEE Q5, SB.EMPLOYEE Q3, SB.DEPARTMENT Q4
   WHERE Q3.WORKDEPT = Q5.WORKDEPT AND Q3.SALARY<Q5.SALARY
      AND Q4.MGRNO=Q3.EMPNO

FIG. 7

COMPUTER AUTOMATED SYSTEM AND METHOD FOR OPTIMIZING THE PROCESSING OF A QUERY IN A RELATIONAL DATABASE SYSTEM BY MERGING SUBQUERIES WITH THE QUERY

TECHNICAL FIELD

The present invention is in the field of computerized processing of queries for retrieving data from a relational database.

BACKGROUND OF THE INVENTION

A database management system (DBMS), as used herein, is the combination of an appropriate computer, including direct access storage devices (DASD) or disk drives, and database management software. A relational DBMS (RDBMS) is a DBMS which uses relational techniques for storing and retrieving data. Relational databases are computerized information storage and retrieval systems in which data in the form of tables is typically stored on disk drives or DASD for semi-permanent storage. A tattle is composed of rows which are formally called tuples. Each tuple has one or more columns. A tuple expresses a mathematical relation. A very of a table can be a set of its columns or the tuple identifier (TID) of its tuples.

The DBMS is structured to accept commands to store, retrieve, and delete data. One widely used and well known set of commands is called the Structured Query Language (SQL). The term query is used to refer-to a set of commands to retrieve data from the DBMS. The definitions for SQL provide that a DBMS should respond to a particular query with a particular set of data given a specified database content, but the method that the DBMS uses to actually find the required information in the tables on the disk drives is left up to the DBMS. Typically there will be more than one method that can be used by the DBMS to access the required data. Because the tables can be very large, as in the case of a bank's accounts database for example, it is important to optimize the method used to find the data requested in a query in order to minimize the computer time used and, therefore, the cost of doing the query.

A simple example of a query is:

```
SELECT COLUMNX
FROM TABLE1
WHERE COLUMNY = 'London'
```

This query requests that the DBMS retrieve all COLUMNX fields from tuples in TABLE 1 which have COLUMNY equal to 'London'. In practical applications the query can become very complex. Multiple tables and multiple columns can be referenced. In order to distinguish which column of which table is being referenced COLUMNX of TABLE 1 may be written as TABLE 1.COLUMNX.

One of the most powerful features of SQL is the capability of nesting SQL query expressions within the predicate in the WHERE clause. Nested SQL queries are called subqueries. With subqueries, one can compare the column expression of a query to the column expression of another query. One can also compare column expressions with subqueries whose result is a table, either by testing set membership, testing if ANY row if the table expression has a property, or testing if ALL do. It is often quite natural to formulate a query using subquery in the predicate For example, to find all the employees who earn less than their manager, one may write

```
Example 1:
    Relation: EMP (NAME, EMPNO, MGRNO, SALARY)
    SELECT*
    FROM EMP EMPLOYEE
    WHERE SALARY > (SELECT SALARY
                    FROM EMP MANAGER
                    WHERE MANAGER.EMPNO=
                          EMPLOYEE.MGRNO)
```

Subqueries are often used in SQL update, delete and insert statements. For example, to delete all the accounts from the MASTER table which have 'D' entries in the REVISION table, one may, write:

```
EXAMPLE 2:
    Relations: MASTER (ACCNO, AMOUT, . . .)
               REVISION (ACCNO, TYPE, . . .)
    DELETE FROM MASTER
        WHERE ACCNO IS IN (SELECT ACCNO
                           FROM REVISION
                           WHERE TYPE='D')
```

Views, as defined in Database Language SQL2 (ISO/ANSI Working Draft: Database Language SQL2 and SQL3:X3 H2/90/398 ISO/IEC JTC1/SC21/WG3, 1990, are SQL structures which provide a means for naming queries. Views can be used to make applications more independent from the names and format of the underlying objects (columns and tables). Authorization is associated with views so that views cart be used as a protection mechanism to restrict access to a table horizontally or vertically via projection or restriction. Views may also make use of joins and other SQL capabilities. In view transformations it is usually more efficient to merge a view with the query using it. This is sometimes called composition, as opposed to materialization. Subqueries are analogous to views which also can be used as subparts of other queries.

Table expressions, as defined in Database Language SQL2, specify tables. That is, table expressions are expressions whose values are tables. For example, views are table expression. Table expressions cart be specified using the SQL "FROM" clause wherein the derived table and columns can be optionally named. It is desirable to use a table expression instead of materializing a temporary table/view, which one has to create, populate with the right tuples, and then drop.

There is a need when processing queries for selecting a method of processing the subquery which will give an optimized performance. A database user needs to be able to retrieve data if a reasonable period of time. When database are large, the time taken to retrieve data cart be critical to the operability of the database. There are many ways in which a query can be processed so that it can be carried out in a minimal amount of time. The order in which the query is processed and data retrieved effects the overall time for retrieving the data. Some areas of query processing optimization such as the joins which are used to merge tables for retrieving the requested data have been separately researched for optimal implementation.

In Example 2, it is necessary to know which tuples in the MASTER table have been marked for deletion in the REVISION table. A commonly used method of processing queries containing a subquery is to evaluate the subquery for each row in the outer query. In Example 2 this approach would result in evaluating the subquery for every row in the MASTER table which could be quite large.

A better approach known to those in skilled in the art is implemented in the article "System R" (M. Astrahah et al, "System R: Relational Approach to Database Management" ACM Transactions on Database Systems, June 1986, 97–137. The System R article provides that where a subquery is non-correlated, i.e., not defined from one column to another column, the subquery is evaluated once and the result is saved for comparison to the outer query. (see P. Selinger, et al., in "Access Path Selection in a Relational Database Management System", June 1979, Procs. ACM SIGMOD). However, the System R processing scheme is inefficient when either:

1. Many rows in the outer table have the same value for the columns which are compared to the columns of the inner table of the subquery. In Example 1, a manager may have many employees, so many rows in EMP have the same MGRNO. In this case, the manager's salary is retrieved for every employee row. Many redundant evaluations of the subquery are performed due to inefficient duplicate processing.

OR

2. The outer table is very large, the inner table of the subquery after restriction is very small, and only a few rows in the outer table satisfy the subquery. In Example 2, the MASTER table is very large but only a few rows are to be deleted. Scanning every row in a large table in order to delete a few rows that satisfy the subquery is an inefficient way of subquery processing.

The query processing method of evaluating subquery for each row of a query is very inefficient since it entails row-at-a-time; operation. Efficient sequential access of the inner table of the subquery cannot be exploited. Options for parallel processing in the subquery are extremely limited. A more efficient way of processing the subquery is to merge the subquery with the outer query so that it is handled as a join. By transforming the subquery into a join:

A Different join sequence can be considered (solving the Example 2 problem),
Different join algorithms can be employed (solving the Example 1 problem),
For the inner table, synchronous I/O is avoided and set processing is permitted.
A new join column (which may be sargable and indexable) is added.
Transitive closure can be applied to the new added join column.
The subquery table can be accessed directly in the join.
Correlation is eliminated.

As can be appreciated from the foregoing, it is desirable to transform an occurence of a subquery in a query into a join operation. Currently available commercial relational database products apply subquery to join transformation in limited situations; such as, when a unique index exists on the selected columns in the subquery. Current optimizers do not perform subquery transformation for UPDATE/DELETE statements and the cursor SELECT statements that would be updated or deleted via WHERE CURRENT OF statements. Furthermore the known query optimizers do not perform any optimization for scalar subqueries with simple SELECTs.

R. Ganski, and E. Wong, "Optimization of Nested SQL Queries Revisited", 1987, Procs. of ACM SIGMOD Conference; W. Kim, "On Optimizing an SQL-like Nested Query", September 1982, vol 7:3, ACM Transactions on Database Systems; and O. Anfindsen, "A Study of Access Path Selection in DB2" Norwegian Telecommunications Administration and University or Oslo, Norway, all disclose optimizers which are limited in terms of the amount of merging and the subquery to join transformations that are to be performed. Therefore these optimizers do not minimize as thoroughly as possible the time taken to retrieve data from a relational database.

There are significant occurences of queries, where optimization could be performed for the queries, subqueries, views and table expressions, but, the current computer based query optimizers are not optimizing these queries.

Databases can be quite large and it is desirable that the time taken to retrieve data from the database be as short as possible. Therefore, there is a need to be able to identify when merges of subqueries can be done without compromising the integrity of the result in terms of the duplicates that are generated or eliminated. There is likewise a need to perform merges as much as possible, so that the query can be processed more efficiently. An optimization process which performs merges as much as possible has the result of improving the speed by which data is retrieved for the database when requested by a database management system user by means of a query.

SUMMARY OF THE INVENTION

A relational database management system uses a data processor for storing data in the form of a plurality of tables comprised of a plurality of tuples having one or more columns of predicates. Key columns enable the unique identification of the tuples. The data is retrievable by means of SQL queries which can include a subquery.

In a preferred implementation of the invention, a data processor optimizes the processing of a query by performing a sequence of steps. The first step is to perform a plurality of rules to determine whether a subquery has a requirement of retrieving distinct tuples and setting an indicator when distinct tuples are needed. The second step is to perform a merge of the query and the subquery where the indicator indicates theft distinct tuples are not needed. The third step is to add a unique value to each tuple in a subquery table in tables that could not be merged in order to provide a key so that distinct tuples are not needed. These three steps are repeated until the query is no longer changed by these steps.

The foregoing process provides that subqueries can be merged and can benefit from being joined rather than having to be materialized. In that way the query can be more optimally processed and require less time to retrieve the data from the database requested by a user by means of the query.

The foregoing processes can be understood more throughly as follows: A relational database management system uses a data processor for storing a plurality of tables of data comprised of a plurality of tuples. Tuples have one or more columns of predicates. Key columns provide for unique identification of the tuples. The data is retrievable by means of SQL queries that can be represented by Query Graph Model (QGM) structures. See L. Haas, et al., "Extensible Query Processing in Starburst", 1989 ACM 0-89791-317-5/89/0005/0377, hereby incorporated by reference.

QGM structures represent SQL queries in terms of a plurality of boxes, where each box has a head and a body. Each beefy contains a plurality of iterators being setformers and quantifiers, and a plurality of edges being qualifiers. Iterators range over tables. Boxes containing iterators can be referred to as upper boxes and boxes containing tables ranged over by the iterators are called lower boxes. The head (i.e. output) is what is produced by the setformers in the body. The tables comprise tuples. Tuples comprise columns. A key of a table is a set of columns theft uniquely identify a tuple belonging to that table. The tuples of the table that an iterator ranges over are called iterator tuples. At least one box is a SELECT box. The qualifiers in the select box are called predicates.

A method is provided for optimizing the processing of queries. An attribute is associated with each head which can take on a first and a second value. The first value can be referred to as "IS" and the second value can be referred to as "NONE". The first value represents that the head table does not contain duplicates. The second value indicates that the head table box may contain duplicates.

An attribute is associated with each body which take on a first, a second, and a third value. These values can be referred to respectively as "ENFORCE", "PRESERVE" and "PERMIT". The first value indicates that duplicates in the output table of this body must be eliminated. The second value indicates that the operation performed by the box does not effect duplicates in the tables. The third value indicates that the operation may perform duplicate elimination.

An attribute is associated with each of a plurality of iterators (iterators being setformers and quantifiers) which lakes on a first, a second, and a third value. These values can be referred to respectively as "ENFORCE", "PRESERVE" and "PERMIT". The first value indicates that duplicates must be eliminated after a projection over the columns. The second value indicates that the exact number of duplicates generated by lower boxes must be preserved. The third value indicates that duplicates can be handled arbitrarily.

A set of rules are performed on the query for optimizing the processing of distinct attributes in queries. For each SELECT box where for each iterator in the SELECT box, at most one iterator tuple satisfies the set of predicates in the select box, or a key of the table ranged over by the iterator appears in the output (head), the SELECT box head attribute is set to the first value, and the SELECT box body attribute is set to the second value. For each SELECT box where a quantifier (iterator) is a type being existential or universal, the iterator attribute is set to the third value. For each SELECT box where the body attribute has the first value or the third value, the iterator values belonging to the box are set to the third value. For each SELECT box where all iterators ranging over the box have the iterator attribute having the third value, the body attribute is set to the third value.

Each upper SELECT box is merged with a lower box where a setformer ranges over a lower SELECT box and the head attribute of the upper select box head attribute has the first value. Each upper SELECT box is merged where a setformer ranges over a lower SELECT box and the body attribute of the upper SELECT box has the third value. Each upper SELECT box is merged where a setformer ranges over a lower SELECT box and the body attribute of the lower select box is not the first value.

After a merge is performed the lower body is subsumed by the upper body. If the lower body attribute had the first value and the upper body attribute did not have the third value then the upper body attribute is set to ENFORCE.

For SELECT boxes where the bead attribute has the second value and a key of the table ranged over by the setformer is not present in the output (head), a unique key is added to the head and the head attribute is set to said first value. The foregoing rules are repeated until the performance of these steps does not produce a change in the query.

As mentioned above, this method can also apply to the optimization of table expressions. Users cannot always rewrite SQL subqueries (or views or table expressions) using the join operator due to the semantic differences between join and subquery. The DBMS can perform such a transformation by special handling of the semantic differences (such as duplicates, empty table, etc.) between join and subquery as this invention describes. Methods are disclosed for efficient execution of subqueries, views and table expressions by merging (composing) them into queries wherever possible, hence taking advantage of better join orders, and eliminating correlation.

The foregoing algorithm provides a method whereby a merge can be performed when duplicates can be eliminated in the upper box or the lower box does not need duplicate elimination. This invention optimizes queries wherein all existential quantifiers subqueries (IN, ANY, EXISTS) that are Boolean Factors (where the predicate are ANDed) are merged.

As mentioned previously, performing merges optimizes the way the query is processed which reduces the time required to retrieve the data from a relational database that was requested by the database management user through a query statement.

BRIEF DESCRIPTION OF THE DRAWINGS

FIGS. 3, 4, 5, 6, and 7 are sample queries optimized using a preferred embodiment of this invention.

DESCRIPTION OF THE PREFERRED EMBODIMENT

Figure 1:
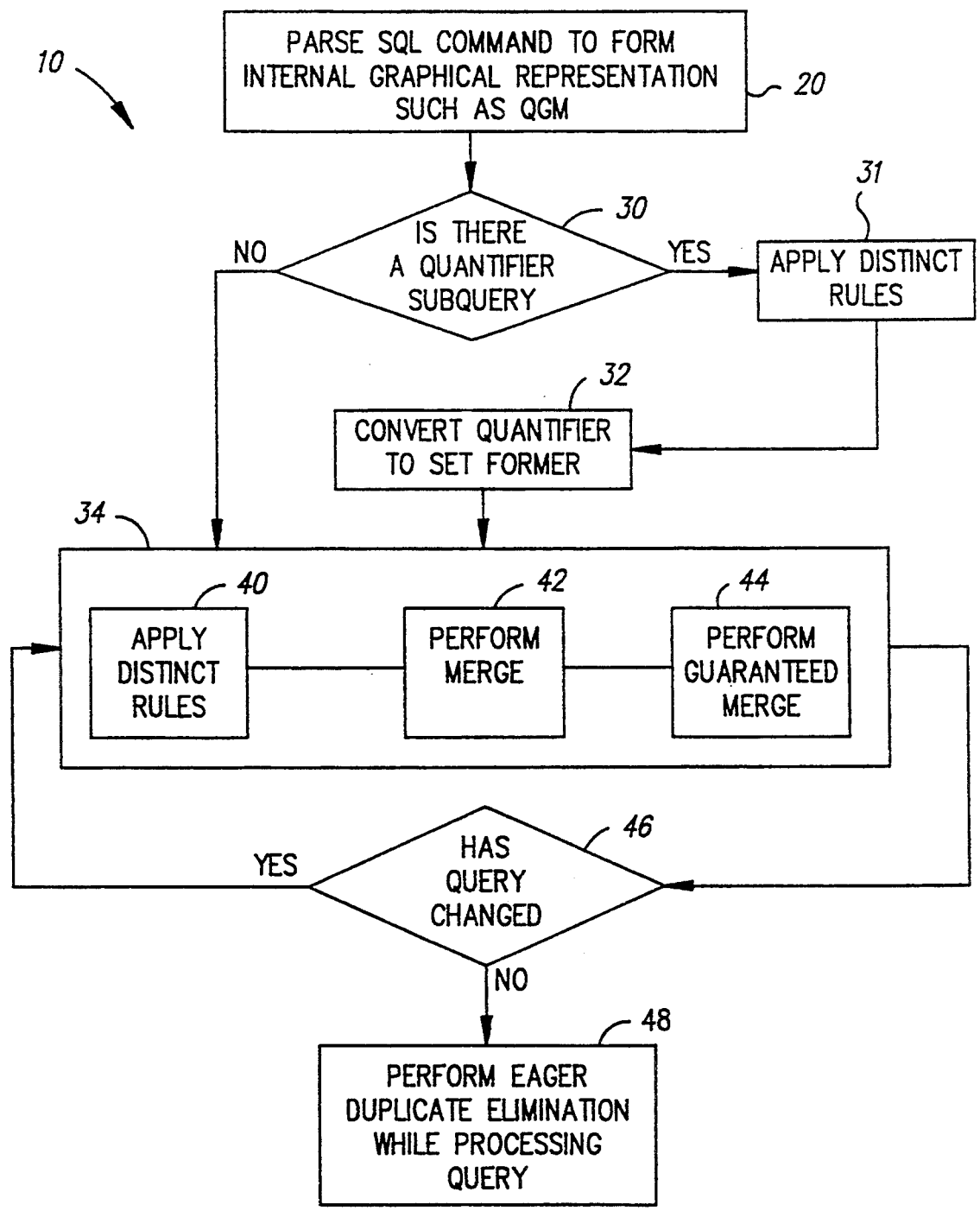
FIG. 1 is a flow chart of a preferred embodiment of this invention for optimizing query processing.

Referring to FIG. 1, an overview of the query processing optimization method is illustrated in a flow chart 10. An SQL command is entered by a database manager to retrieve information from a database. This command statement is processed by the database management system on a data processing machine. First, the statement is parsed and the semantics of the statement are checked for compliance with grammatical/semantic rules. Then an internal representation of the command is made for the system in order for the system to process the command. In the example provided, a QGM representation is used. This is not the- only representation that can be made. In one form of the invention, an automated method is provided to transform the query into a different graphical representation in order to improve the performance of the processing of the query for retrieving data quickly. Improvements relate to merging subqueries with the underlying query so that join operations can be performed. The ability to perform joins is important because there are a number of techniques available for improving the processing time for join operations. An additional improvement is achieved by preventing duplicates from being generated so that processing is not slowed unneccessarily by large interim tables that are produced during join operations.

An initial step in the preferred embodiment is to identify whether a quantifier exists 30. A quantifier can be changed into a setformer in order to benefit from the optimization process 32.

A three pad process is performed on the queries 34. First, a set of rules are applied to determine the role of duplicates in the query processing 40. A query which includes a DISTINCT attribute, normally cannot be merged since the merge will restrict the identification of duplicates which is required by a query command. The rules for processing queries with DISTINCT attributes is detailed below.

Before a quantifier is converted into a setformer, these distinct rules are applied to the quantifier 31.

The second part of the process is to perform merges of all queries that have been identified as not having a constraint which would prevent it from being merged, such as needing to identify duplicates of an operation 42. The method of identifying mergeable queries is also detailed below.

The third part of the process is the guaranteed merge 44. This portion alters the queries which were identified as not being mergeable to allow such queries to be merged. A field is added to the tables for the table key, so that the results for the operation will not produce duplicates. This method will also be explained in detail below.

These three processes can be carried out in any order without changing the performance of this optimization method. Moreover, these processes are repeated until all three processes are performed on a candidate query representation without altering that representation 46.

A further component of the preferred embodiment of the invention is to perform a set of heuristics for eliminating duplicates during the processing of the query 48.

For purposes of explaining a preferred embodiment of the invention, the Starburst Query Graph Model (QGM) will be used for representation of queries. See L. Haas, et al., "Extensible Query Processing in Starburst", 1989 ACM 0-89791-317-5/89/0005/0377. QGM provides a uniform representation of SQL functions such as IN, ANY, and EXISTS. This simplifies the specification of the algorithms explained below. However, implementation of these algorithms does not require the QGM structure. Hence, the algorithms are equally applicable to various DBMS products.

Figure 2:
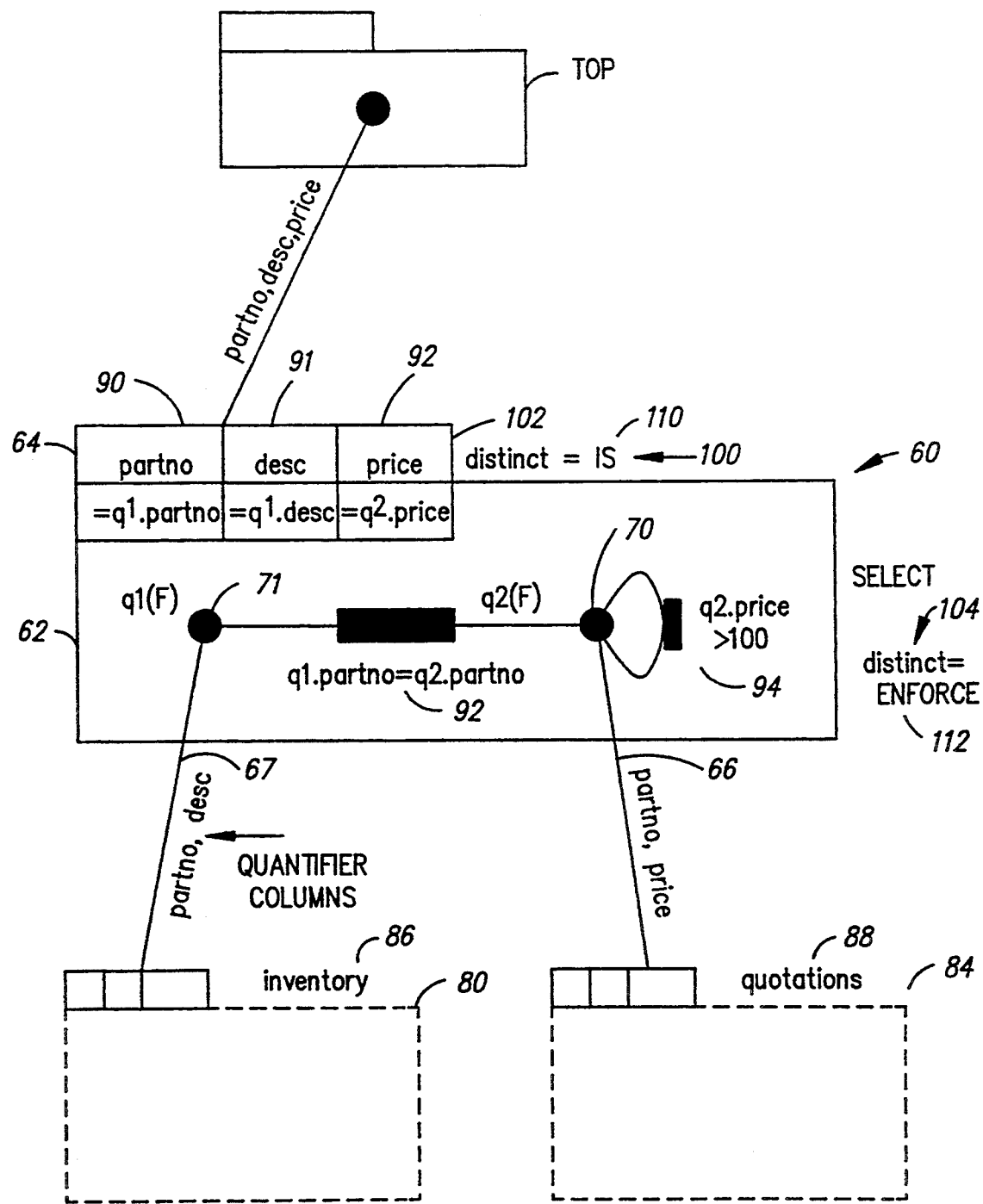
FIG. 2 is a QGM diagram of an SQL statement.

An overview of QGM can be explained with reference to FIG. 2 where an SQL query is shown in a QGM graphical representation. The following SQL query is represented in FIG. 2:

```
SELECT DISTINCT Q1.PARTNO, Q1.DESCR, Q2.PRICE
FROM INVENTORY Q1, QUOTATIONS Q2
WHERE Q1.PARTNO=Q2.PARTNO AND
```

-continued
```
Q2.PRICE>100
```

A SELECT box 60, has a body 62 and a head 64. The body 62 has iterators 66, 67 (also shown as vertices 70, 71). The vertex 66 is a setformer that ranges on the box 80 (equivalent to iterator 71). The vertex 67 ranges on the box 84 (equivalent to iterator 70). The attributes to be retrieved from the query, PARTNO 90, DESC 91, and PRICE 92, are in the head 64. The boxes 80 and 84 represent the tables accessed by the query, INVENTORY 86 and QUOTATIONS 88. The box contains the operations to be performed on the query to identify PARTNOs that match in the two tables (edge 92) and identify prices of those PARTNOs that are greater than one hundred (edge 94).

For discussion purposes, subqueries that are simple SELECTs, i.e., without aggregation, group by, set operations, etc. will be used. The subqueries may have other subqueries (existential or universal) within them. Merge is usually not possible for subqueries with richer operations, although the "subquery to join" transformation described below could still be applied to them.

Distinct Attributes and Rules

The distinct attributes are as follows:

A distinct attribute is associated with any base table. This attribute states that whether the table contains any duplicates. The same attribute is associated with the output table of any SQL operation (a QGM box). The output table of a QGM box is roughly equivalent to the output of a query, a subquery, a view, or a table expression. This attribute is referred to as head.distinct. The values of head.-distinct are:

IS, which means the table does, not contain any duplicates.

NONE, which means it may have duplicates.

A distinct attribute is associated with the body. This attribute specifies whether duplicates can (or should) be eliminated by a SQL operation (e.g., join) in order to make its output table distinct. The values of body.distinct are as follows:

ENFORCE, which means that duplicates need to be eliminated in order to enforce head.distinct-=IS.

PRESERVE, which means no duplicate elimination is required. This could be because head.distinct=NONE, or if head.distinct=IS no duplicates exist in the output of the operation even without duplicate elimination. This attribute would also apply when the operation does not eliminate (or generate) new duplicates.

PERMIT, which means that duplicates can be eliminated (and generated) arbitrarily. For example, existential and universal subqueries are not sensitive to duplicates. Therefore, one can eliminate some of the duplicates in the subquery. Basically, this attribute increases the oportunities for merging the operations (views, table expressions, subqueries, etc).

A distinct attribute is associated with each iterator. This attribute is added for simplification of the algorithms. An iterator is similar to a cursor. Hence, table references in the FROM clause are iterators; iterators of this type are called setformers. The only setformer discussed in this disclosure has type F (foreach); it iterates through tuples for joins, etc. Cursors that are bound by quantifiers ranging over the results of subqueries are also iterators; iterators of this type are called quantifiers. SQL has both universal and existential quantifiers. Existential quantifiers are called E quantifiers (Exists). There is a special kind of existential quantifier called the ES quantifier (Existential Single), which is described later. Universal quantifiers are called A quantifiers (All). The values of iterator.distinct are as follows:

ENFORCE, which means duplicates must be elimininated after projection over the columns used by this iterator. Note that the table that this iterator ranges over may have distinct=IS, but due to column projection for this iterator, there may be duplicates.

PRESERVE, which means that the exact number of duplicates produced by lower level operations must be preserved. This is the default value of iterator.distinct.

PERMIT, which means that the lower level operations can eliminate (or generate) duplicates arbitrarily. All of the universal and existential quantifiers have this value for their distinct attribute.

In the QGM representation of FIG. 2, attributes 100, 104 are assigned to the head 64 and body 62. The head attribute 100 has a value designated IS 110 which indicates that duplicates need to be eliminated. The body attribute 104 has a value of ENFORCE 112 which means that the operation performed by the box must enforce that retrieved tuples are distinct.

The following two conditions are used in the transformation rules.

One-tuple-condition:
Given an iterator and a set of predicates, this condition is TRUE if at most one tuple of the iterator satisfies the set of predicates.

Output-distinct-condition:
Given an iterator in a SELECT box, this condition is TRUE if
at least the primary key or a candidate key of the iterator appears in the output directly or through transitivity A key of a table can be a set of its columns or the TID (tuple identifier) of its tuples.
DISTINCT rules:
1. Rule for pulling up DISTINCT attribute.

```
IF in a SELECT box,
    for all setformers, output-distinct-condition holds
    or one-tuple-condition holds
THEN
    head.distinct = IS;
    body.distinct = PRESERVE;
```

Refering to FIG. 3, the Distinct pull-up rule is illustrated for query 132. The query 132 contains the attribute DISTINCT 134 which specifies that the SQL statement cannot output duplicate records. The pull-up distinct rule identified that Empno 136 is a unique identifier and that each record distinguished by Empno would be unique. Therefore the DISTINCT attribute 134 is not needed and is replaced by the ALL 138.

2. Rules for pushing down the DISTINCT attribute from an operation.

```
a. IF in a SELECT box a quantifier has type = F or A
   THEN quantifier.distinct = PERMIT;
```

This is because the existential and universal quantifiers do not care about duplicates.

```
b. IF in a SELECT box body.distinct = PERMIT or ENFORCE
   THEN
       For all the F setformers in the body of this box:
           iterator.distinct = PERMIT;
```

3. Rule for pushing DISTINCT attribute to a box.

```
IF for a SELECT box, all iterations ranging over that box
   have iterator.distinct = PERMIT
THEN
   for this box, body.distinct = PERMIT;
```

The rule provides that if none of the users of the output of a box are affected by duplicates, then this box should not be constrained by having to handle duplicates.

Merge Rules

The Merge Rules can be used in conjunction with two QGM boxes, an upper box, and a lower box where the upper box has a setformer ranging over the lower box, e.g., the lower box is a table expression or view used in the upper box. The main rule of merging two SELECT boxes 42 is as follows:

```
/*Merge rule */
IF in a SELECT box (upper box)
   a setformer has type F and ranges
   over a SELECT box (lower box)
   AND
      ( upper.head.distinct = IS
      OR
        upper.body.distinct = PERMIT
      OR
        lower.body.distinct NOT = ENFORCE
      )
THEN DO;
   merge in the lower box into the upper box;
   IF lower.body.distinct = ENFORCE
      AND
        upper.body.distinct NOT = PERMIT
      THEN upper.body.distinct = ENFORCE;
   END;
```

The merge rule provides that when duplicates can be eliminated in the upper box or the lower box does not need duplicate elimination, the boxes can be merged. This rule is broader than the rules that are currently used for merge (composition) in any of the existing RDBMS products.

Guaranteed Merge

If the upper box output contains duplicates (and body.distinct=NONE) then the above merge rule does not apply. One way to solve this problem is to make the upper box have head.distinct=IS by adding the keys of the input tables to the head, hence guaranteeing the merge 44. For example:

```
IF in a SELECT box head.distinct = NONE
THEN DO;
   FOR each setformer:
```

```
IF a key of the setformer does not appear in the output
    THEN Add the key to the head;
    head.distinct = IS;
END;
```

A key of a table can be a set of its columns. For base tables or temporaries, the TID of the tuples can be used as the key. If a table does not have a key, one must be generated. Obviously, a key need only be added for setformers whose keys are not already part of the output. Notice that as a result of this rule, the merge rule can always be applied. The side effect of this is that duplicates may have to be eliminated when upper boxes use the box's output, which has an extra cost. However, this extra cost can be reduced or even eliminated. With cursor stability isolation level, or when the user in the same transaction is doing concurrent updates to the database, TIDs are not stable. It is possible that during a query execution, a TID is included in the output, then the tuple with that TID is deleted and reused for an insert in the same table later and then the new tuple is read. As a result, two tuples from a table may have the same TID. This is not a serious problem because the chance of this happening is very low and should it occur, when the columns used in the output have the same value, the duplicate tuple will then be eliminated.

Referring to FIG. 4, the distinct pull-up rule eliminates the distinct enforce of a view. As a result of eliminating the requirement for enforcing the distinct requirement, the view is merged 12. The query 150 accesses a view that was created by the SQL statement 152. The query command 150 will retrieve full records from the created view 152. The view creates a table on all employees that make less than $20,000. Ultimately, this information on the employee will be retrieved along with information on the department in which the employee works which is stored in the department table.

The created view 152 has a DISTINCT attribute 154 which requires that only distinct records be included in the view 152. However, one of the fields for the SELECT 156 is EMPNO 158, which is a key of the the employee table 160. The distinct pull-up rules identified that because EMPNO 158 is a key, the DISTINCT attribute did not have to be enforced because only distinct records would be retrieved using EMPNO as a criterion for inclusion in the view 152.

The Distinct rules 40 also set indicators that the view 152 and the query 150 can be merged. The merge 42 rules recognize that the view and query can be merged and are merged to form the optimized query 170. There is no need to perform the guaranteed merge 44. Repeating the optimization process 34 does not change the query 170 so the optimization process terminates 46 and the optimized query 170 is processed.

Referring to FIG. 5, the SQL query 180 contains a subquery 182 which references a view 184. The view 184 contains data on all employees that earn a salary greater than $50.000. The query 180 retrieves manager employee numbers for managers that do not have an employee in their department that is in the view 184.

As a result of pushing the distinct enforcement to the subquery, the view 184 and the subquery 182 can be merged The distinct rules 40 recognize that a merge can be performed and perform the merge resulting in the optimized query 190.

Referring to FIG. 6, a query 200 references a view 202. The view 202 retrieves distinct employee salaries. The query 200 retrieves the managers and departments and unique salaries of employees of these departments. The view must retrieve unique tuples. However, there are no keys which would ensure current output after merge of the view. The guarenteed merge process 44 adds a column 210 (TID of the table) which is comprised of the table key columns in order to ensure duplicate tuples of managers are not removed. Since the duplicates are not a problem, the view and the query can be merged to form the optimized query 212. The guaranteed merge process 44 sets parameters for the merge process 42 to identify that the query 200 is mergable with the view 202.

Subquery to Join Transformation Rules

In QGM, existential subqueries are represented by quantifiers of type E. This includes the SQL functions EXISTS, IN, and ANY. Scalar subqueries are represented by quantifiers of type ES. Scalar subqueries require special treatment because these subqueries must return at most one tuple. When a subquery is empty, the result of the quantified subquery is null, which results in the extended Boolean value UNKNOWN. Existential subqueries return FALSE if empty.

First, subquery to join rules determine whether the quantifiers can be converted to setformers 32 (this is similar to converting the subquery to a table expression). Setformers can then be optimized using the optimization process 34 described above.

```
/* Existential quantifier to setformer conversion rule */
IF in SELECT box there is a quantifier of type E forming
    a Boolean factor
  AND
  ( head.distinct = PERMIT
  OR
    body.distinct = PERMIT
  OR
    one-tuple-condition
  )
THEN DO;
  set iterator type to F; /* CONVERT
      E quantifier to a setformer;
      hence looks like a table expression */
  IF one-tuple-condition is FLASE
  AND head.distinct = IS
    THEN body.distinct = ENFORCE;
  END;
```

Note that for IN ( . . . ) subqueries, the one-tuple-condition holds as long as the result of the subquery does not have any duplicates (or when these duplicates are eliminated). As shown in the rule, this conversion may require elimination of duplicates, which incurs an additional cost. However the added cost for duplicate elimination can be avoided in most of the cases.

The one-tuple-condition can be evaluated as follows. First the IN and ANY predicates can be rewritten in the form of EXISTS, by pushing down the predicates. For example the following join statement:

$$c1 \ \Theta \ \text{ANY (SELECT c2 FROM T11, \ldots, T1n}$$
$$\text{where P2( \ldots ))}$$

can be conceptually rewritten as:

$$\text{EXISTS (SELECT \ldots FROM T11, \ldots T1n where}$$
$$\text{P2( \ldots ) AND c1 \ \Theta \ c2)}$$

It should be noted that c1 can also be a row expression (a composite column). In fact, the Θ can be generalized to be any general predicate, called P1( ... ), whose written form would be:

. EXISTS (SELECT ... FROM T11, ..., T1n where
   P2( ... ) AND P1( ... ))

The same transformation applies to the IN predicate. Therefore, only the truth of the one-tuple-condition for the EXISTS case needs to be determined.

Even when the quantifier type cannot be converted to F, the subquery may still be eliminated, hence eliminating correlation and the overhead of executing the subquery. When a subquery is in the form of EXISTS ( ... ) and is not correlated, then no transformation is needed. It is executed once, and its result (TRUE, FALSE, UNKNOWN) is used. If the subquery is a correlated EXISTS, or it is in the form of IN or ANY, then it might be beneficial to merge the subquery. IF it is correlated, the subquery merge will eliminate correlation, which is usually beneficial. Further, for the case of IN or ANY, once the subquery is merged, the predicate involved in IN or ANY to access the table referenced in the subquery can be used, hence improving the chance of using better access paths. For this transformation, a general form of the EXISTS predicate is used, which can be described as follows (the form used in Starburst SQL).

EXISTS (<table>, <predicate>)

The interpretation is exactly the same as for IN and ANY subqueries, except that the <predicate> is any general predicate, instead of only comparison operators such as =, >, etc. allowed for IN and ANY. Hence, the result is TRUE if there exists one tuple in <table> where <predicate> is TRUE. The result is FALSE if for all tuples of <table> the <predicate> is FALSE. Otherwise, the result is UNKNOWN. A general form of ALL subqueries is used which can be described as follows:

ALL (<table>, <predicate>)

This has the same meaning as the SQL ALL, except that <predicate> is generalized (just as for EXISTS). The subquery:

EXISTS ((SELECT ... FROM T where P2( ... )),
   P1)

where, P1 is used for IN or ANY predicates, P2 is used within the subquery, and P2 may have references to parent query blocks, making the subquery correlated, can be rewritten as follows:

EXISTS (T, P1 AND UNKNOWN_TO_FALSE
   (P2( ... )))

Note that this form eliminates the subquery. The UNKNOWN_TO_FALSE function is needed only if the predicate P2 refers to nullable columns and there is an odd number of NOTs between EXISTS and the root of the associated Boolean Factor. The UNKNOWN_TO_FALSE function maps UNKNOWN results to a FALSE value, but does not change truth values TRUE or FALSE. Hence it maps three value logic to two value logic. UNKNOWN_TO_FALSE(p) can be written as p IS TRUE. The predicate IS TRUE is defined with the obvious meaning in P. Shaw, "Standards Meeting Report", November 1989, Florence, ISO WG3 Database Languages Committee Meeting. Assuming for all tuples of T, P2 is unknown, then the subquery is empty, and the result is FALSE. However, if the UNKNOWN_TO_FALSE function is not in the new form of the EXISTS, then the result depends on P1. If P1 is UNKNOWN for all tuples of T, then the result is UNKNOWN, which is incorrect. However, if there is an even number of NOTs between this EXISTS predicate and the root of the Boolean Factor, then the UNKNOWN_TO_FALSE function need not appear. For example, if all NOTs are eliminated using DeMorgan's laws, then the UNKNOWN_TO_FALSE Function is unnecessary.

Referring to FIG. 7, a subquery is converted to a table expression. A table expression does not have to be composed. In that way the processing of the query requires less time and storage space. After the subquery is converted to a table expression it can be merged with the query.

An Alternate Embodiment of the Invention for Duplicate Avoidance

One drawback of the merge rule is that it may force the query to eliminate duplicates (i.e., sets body.distinct = ENFORCE). This may happen for views, table expressions, and subqueries. For an existential subquery, this may happen if multiple tuples of the subquery match at every evaluation of the subquery due to existence of duplicates in the subquery result, or multiple distinct tuples of the subquery output match. An embodiment of the invention provides a method for avoiding the creation of duplicates as much as possible, hence avoiding unnecessary elimination of duplicates later on. The following rules of this embodiment require knowing what predicates are applied to the tuples of a quantifier when the associated table is accessed. In general, this requires knowing the join order. The rules apply to both brushy and non-brushy joins.

The first rule tries to convert an F quantifier to an E quantifier. Note that the evaluation of E quantifiers does not create duplicate tuples because it can only return TRUE or FALSE.

```
/*Setformer to existential quantifier conversion*/
IF in a SELECT box a quantifier of
type F is accessed with a given
   set of predicates
AND
   body.distinct = ENFORCE
AND
   ( NOT one-tuple-condition
   OR
   ( NOT(output-distinct-condition)
      OR ( after this access none of the columns of this
         quantifier are used any more
         OR ( after this access columns of this quantifier only
            only used in the output with expressions only
            referring to these columns
            AND no user of the output table refers to these
               columns
         )
      )
   )
   )
THEN
   Convert this setformer to a quantifier of type E;
   Eliminate all the columns in the output that refer to this
      quantifier;
```

Duplicate elimination can be postponed until the end of computation of a SELECT box. The following rule minimizes the need for duplicate elimination. This rule uses intermediate results, which are the results obtained by applying relational operators to inputs of a SELECT box. An intermediate result is DISTINCT when duplicate elimination was implemented when it was created. A derivation tree of an intermediate result consists of all the iterators that contributed to this intermediate result, and all the intermediate results in between these iterators and this intermediate result. Given an intermediate result, a set, called potential-dupgen-set, is formed from all the values of the tree going down from the intermediate result, and stopping when the node is distinct or is a leaf. The distinct node is included in a potential-dupgen-set.

```
IF in a SELECT box duplicate
    elimination is attempted on an intermediate result
AND all the nodes of potential-dupgen-set
    satisfy output-tuple-condition
THEN duplicate elimination can be ignored;
```

In this rule, when applying the output-distinct-condition, an intermediate node of potential-dupgen-set is modeled as an iterator.

The above rules allow us to avoid generating duplicates (hence avoiding duplicate elimination) in many cases. When a subquery has one setformer and it is chosen as the inner of the, join then an early stop can be done. However when a subquery has only one setformer and it is chosen as the outer of the join, duplicates may still have to be eliminated. The above rules allow duplicates to be eliminated early avoiding more costly duplicate elimination later on. For example, when duplicates are eliminated in an IN subquery, the one-tuple-condition is satisfied.

The advantage of subquery merge is that the tables in the subquery are directly accessed, thus avoiding the overhead of executing the query in a separate block, which might be very high if the subquery is correlated.

Scalar Subqueries

In some occurrences of scalar subqueries, the invention allows the scalar subqueries to be merged, hence eliminating any correlation, and the overhead of execution of subqueries. Scalar subqueries are represented with quantifiers of type ES (existential single). One major difference between scalar subqueries and existential subqueries is that the existential ones return FALSE if the subquery is empty. Scalar subqueries return a null value, which results in UNKNOWN. In this case, the attempt is made to convert the ES quantifiers to E quantifiers, hence benefiting from the transformations discussed above for existential subqueries.

```
/*Rule for conversion of type ES quantifiers to E quantifiers/
IF in a SELECT box there is scalar
subquery (type ES quantifier)
  AND
    there is an even number of NOTs between this predicate and
    the root of the associated Boolean factor
  AND
    for each evaluation of this subquery at most one tuple
    is produced
    /* this must be provable at compile time */
THEN
  Convert the quantifier type to E
```

Once this transformation is done, the rest of the rules associated with the existential subqueries can be applied. The condition about even number of NOTs (e.g., zero) is needed to eliminate the need to differentiate between UNKNOWN generated empty scalar subqueries and FALSE generated by empty existential subqueries. Also, as in the current art the condition is used for checking that at most one tuple is output in the subquery. This condition states that the subquery must have a key = <value> predicate for all the setformers in it. <value> may be computed using constants, host variables, or correlation variables.

Universal Quantifiers (NOT EXISTS Case)

NOT EXISTS subqueries are quantifiers of type universal. Such subqueries are not merged in the method of the invention, but transformations are introduced that allow elimination of correlations and also allows the NOT EXISTS subqueries to be treated similar to regular joins as far as join reordering is concerned. For example, a NOT EXISTS subquery may become an outer query, which may be very beneficial due to existence of very selective predicates in the NOT EXISTS subqueries. Currently such a join order is not allowed in prior art database systems.

First the correlated subquery case is considered. Here the subquery is only allowed to have exactly one table. In this case, the method of the invention is able to eliminate the subquery, hence eliminating the correlation. Assume the subquery has the form:

NOT EXISTS (SELECT 1 FROM T WHERE P( .
 .. ))

Predicate P is any general predicate allowed in the WHERE clause (including ANDs, ORs, NOTs, subqueries, etc), which may refer to table T and may have references to host variables, correlation columns, etc.

The NOT EXISTS subquery can be rewritten using the general form of EXISTS:

NOT EXISTS (T,
    UNKNOWN_TO_FALSE(P(T, ... )))

Here, the subquery has been elimininated and direct reference is made to table T. The predicate P can also be modified slightly using the UNKNOWN_TO_FALSE function. The UNKNOWN_TO_FALSE function is needed only if the predicate P refers to nullable columns as mentioned before. Suppose for all tuples of T, the P( ... ) returns unknown. Before this transformation, the subquery returns no tuples, hence EXISTS returns TRUE and NOT EXISTS returns FALSE. After transformation, if the UNKNOWN_TO_FALSE function is not used, the EXISTS will return unknown, hence NOT EXISTS returns unknown, which is incorrect.

Now this form of NOT EXISTS can be converted to the general form of ALL introduced:

ALL (T, NOT(UNKNOWN_TO_FALSE(P(T, ..
 . ))))

The quantifier associated with T has type A (universal quantifier). The general form of a query where NOT EXISTS is used is:

SELECT ...

```
-continued
    FROM S1, S2, ..., Sn
    WHERE ... AND NOT EXISTS
        (SELECT 1 FROM T WHERE P(...))
```

After transformation the query is:

```
    SELECT ...
    FROM S1, S2, ..., Sn
    WHERE ... AND ALL
        (T, NOT(UNKNOWN_TO_FALSE(P(...))))
```

P may refer to one or many of S1, ..., Sn. If this subquery is not a Boolean factor (e.g., it is ORed with other predicates) then no further transformation is done. However, T call be directly accessed, hence eliminating the overhead of accessing T within a subquery. If this predicate forms a Boolean factor, T can be treated just like S1, ..., Sn to determine the join orders. For a given join order, the following logic can be used:

```
    if during this join not all bindings p(...) are available
        then join order is not allowed;
    elseif T is being accessed as the inner of the join
        apply the standard logic for universal
        quantifiers (with early stop);

* else
    /*T is being as the outer of the join*/
        apply ARJOIN algorithm;
    end
```

ARJOIN is a variant of outer join which is described in commonly owned U.S. patent application, Ser. No. 07/749,088, filed Aug. 23, 1991. So, if the subquery only refers to one table of the outer query, and contains only one table, the subquery can be merged (hence eliminating the correlation) and any join order is satisfactory if the join is doable with an ARJOIN.

If the subquery is not correlated then it is trivial. The method assumes it is executed once and its result, which is TRUE or FALSE, is stored, and used as a simple predicate.

Eager Duplicate Elimination

The obvious way to enforce elimination of duplicates is to wait until the output table of a box is computed and then eliminate duplicates, e.g., by sorting as is done in the prior art. There are, however, other occasions when duplicates could be eliminated. Further optimization is achieved by applying heuristics for deciding when to eliminate duplicates during the processing of a query 48.

Assuming that body.distinct=ENFORCE but head.distinct NOT=IS, then there exist setformers in the box, which will be called the upper box, that range over boxes (lower boxes) that also have head.distinct NOT=IS. Any sort performed in the upper box after joining some setformers can be modified to ensure that duplicates arising from those setformers are removed. If at least one sort is performed after each of these setformers, then the execution plan enforces distinct, as required. One way of ensuring this is to do a sort after the output table of the box has been computed. If sorts are required by the join plan (or order by), the sort for duplicate elimination might be handled at the same time. Even if some of the setformers requiring duplicate elimination have not been joined yet, duplicate elimination during (otherwise necessary) sorts is profitable, since it is inexpensive and often reduces the cardinality of the result up to this point. More generally, it may be useful to remove duplicates at an intermediate stage even when this introduces an extra sort. If the join reduces the cardinality, it is preferable to delay the sort. But if it is expected that the cardinality will increase after additional joins, then it is preferable to eliminate duplicates before the joins. Note that filters which eliminate some duplicates inexpensively, e.g., by remembering the most recent 20 tuples and removing them if they repeat, are effective as long as there is a subsequent phase, such as a sort, in which all duplicates are eliminated.

Duplicate elimination and filtering Heuristics

1. Eliminate duplicates at the earliest chance. If a sort is done, e.g., for sort merge or hybrid join, then eliminate duplicates. Since both sort merge and hybrid join methods are expected to be used frequently, the concern about duplicates mainly goes away. This is applicable to both base tables and intermediate results.

2. Apply a duplicate filter, such as the "20 most recent tuple" filter mentioned above, whenever many duplicates are expected. The cost of this is relatively low, and is particularly beneficial when values are approximately clustered.

3. Introduce sorts or filters to eliminate duplicates before cardinality increases due to joins. Cost optimizer estimates for cost and cardinality can be employed to quantify this trade-off.

4. If a subquery is not merged, e.g., for NOT exists, or for an existential subquery which is not a Boolean factor, then the distinct rules set body.distinct: PERMIT for the subquery, allowing, but not requiring, duplicate elimination. Duplicates should probably be eliminated if the expected cardinality of a subquery is large. This is particularly true for do-at-open subqueries. (Do-at-open is defined by P. Selinger, et at., in "Access Path Selection in a Relational Database Management System", June 1979, Procs. ACM SIGMOD). For do-at-open, currently available RDBMS already sort the result for fast access to the result of the subquery. Hence, the cost of duplicate elimination is insignificant.

5. For correlated subqueries, duplicate elimination often is still a good heuristic. If the result of the subquery is small, then the cost of duplicate elimination is not significant. If it is large, then the cost might become significant; however, if the results of correlated subqueries are saved for subsequent references, then the sort is necessary for fast access.

Subqueries in UPDATE and DELETE Statements

This invention does not do UPDATES with ORDER BY unless that can be accomplished without a sort. There might be cases such that after transformations the original cursor on the table is lost. If this happens, TIDs must be carried in order to reverse map the tuples in the answer set to the original tuples to perform the updates. There are two ways that the original cursor may be lost due to transformations. One is through duplicate elimination by copying the data, e.g., sort. Of course, this situation does not arise if duplicate elimination can be avoided. Another possibility is losing the original cursor due to the choice of join method (e.g., sort merge). If none of these happen, the update can still be done based on the original cursor. Otherwise the TIDs need to be carried, and the update done in the same way as UPDATE with ORDER BY. Of course, no problem exists if before the transformations an UPDATE using TIDs was being performed.

The same is true for delete current of cursor. Again, if TIDs have to be carried, the delete should be done the same way as delete with order by. However, set oriented delete is simpler. In this case, no tuple is returned to the user. As a result, duplicate elimination is optional, i.e., body.distinct=PERMIT. This is because, if a tuple is deleted once and then deleted again due to duplicates, in the worst case an error message is generated that it does not exist, which can be ignored.

Performance Study

Performance measurements were obtained though experimentation with optimizing queries using this invention. For each query, cpu time (hence pathlength, which is mostly machine independent) for query execution, SRB and the total response time were studied. (SRB time refers to the cpu time spent to do asynchronous IO). The experiments showed that the query optimization method represents an important improvement in the time necessary to process SQL queries. More view and subqueries can be merged to improve the time requirement for query processing.

While the invention has been particularly shown and described with reference to a preferred embodiment thereof, it will be understood by those skilled in the art that various other changes in the form and details may be made therein without departing from the spirit and scope of the invention. Accordingly, the method herein disclosed is to be considered merely as illustrative and the invention is to be limited only as specified in the claims.

We claim:

1. In a relational database management system using a data processor for storing data in the form of a plurality of tables comprised of a plurality of tuples having one or more columns of predicates, and having key columns for unique identification of the tuples and wherein the data is retrievable by means of SQL queries which include at least one subquery, a query output table of at least one tuple being produced by the processing of the query, a data processor implemented method for optimizing the processing of a query, comprising the steps of:

(a) determining whether the existence of duplicate tuples in the output of the subquery affect the integrity of the tuples output by the query with respect to requested distinct tuples or an accurate number of duplicated tuples in the query output table; and (b) merging the subquery with the query during the processing of the query while the integrity of the tuples output by the query is maintained with respect to requested distinct tuples or an accurate number of duplicated tuples in the query output table.

2. The method of claim 1, wherein step (a) comprises the steps of:

(i) identifying when all tuples in the query output table will be distinct;

(ii) identifying when the query output table can have an arbitrary number of duplicate tuples; and (iii) identifying when there is no requirement that the tuples in the subquery output table be distinct.

3. The method of claim 1, wherein step (b) comprises the steps of:

(i) merging said query and said subquery when the output of the merged query will not be affected by duplicate tuples produced by the subquery;

(ii) for queries where the query output would be affected by duplicate tuples produced by the subquery, altering the query so that duplicate tuples produced by the subquery will not effect the integrity of the query output; and (iii) repeated steps (i) and (ii) until the query and all subqueries are merged.

4. In a relational database management system using a data processor for storing data in the form of a plurality of tables comprised of a plurality of tuples having one or more columns of predicates, and having key columns for unique identification of the tuples and wherein the data is retrievable by means of SQL queries which include at least one subquery, a data processor implemented method for optimizing the processing of a query, comprising the steps of:

(a) determining whether a subquery has a requirement of retrieving distinct tuples;

(b) performing a merge of said query and said subquery when all tuples in the query output table are distinct, or the query output table can have an arbitrary number of duplicate tuples, or there is no requirement that all of the tuples in the subquery output table be distinct;

(c) when no merge was performed by step (b), adding a unique value to each tuple in the query output table so that all tuples in the query output table are distinct; and (d) repeating steps (a), (b), and (c) until said query is no longer changed by these steps.

5. The method of claim 4 further comprising the step of applying a set of heuristics comprising:

eliminating duplicates during a sort;

eliminating duplicates during a hybrid join; and using a duplicate filter for groups of output tuples that are able to fit in RAM.

6. The method of claim 4, further comprising the step of:

eliminating duplicates in the query table after the merge, when the subquery requires that all tuples in the subquery output table be distinct and the query requires an exact number of duplicate tuples in the query output table.

7. The method of claim 4, wherein said unique value comprises a key value for each input table for said query, including the output table of said subquery.

8. In a relational database management system using a data processor for storing a plurality of tables of data comprised of a plurality of tuples having one or more columns of predicates, wherein key columns provide unique identification of the tuples, and data is retrievable by means of SQL queries that can be represented by QGM structures comprising:

a plurality of boxes, each of said boxes having a head and a body, said body containing a plurality of iterators and edges, wherein iterators range over tables, upper boxes contain iterators, lower boxes contain tables ranged over by iterators, said head comprising output from said body, and at least one box being a SELECT box, a method for optimizing the processing of said queries, comprising the steps of:

(a) associating an attribute with each of said heads which can take a first or a second value, said first value indicating that said head does not contain duplicates; and said second value indicating that said head may contain duplicates, (b) associating an attribute with each of said bodies which take on a first, a second, and a third value, said first value indicating that duplicates in said body table must be eliminated;

said second value indicating that the operation performed by said box does not effect duplicates in the tables:

said third value indicating that duplicate elimination may be performed arbitrarily; and (c) associating an attribute with a plurality of iterators which take on a first, a second, and a third value, said first value indicating that duplicates must be eliminated after a projection over the columns of said tables;

said second value indicating that the exact number of duplicates generated by lower boxes must be preserved; and said third value indicating that duplicates may be performed arbitrarily;

(d) performing a set of rules on said queries for optimizing the processing of distinct attributes in queries, comprising:

for each SELECT box, where for each iterator in said SELECT box, at most one tuple ranged over by said SELECT box iterator satisfies a set of predicates in said SELECT box, or a key of the table ranged over by said iterator appears in said head.

setting said SELECT box head attribute to said first value; and setting said SELECT box body attribute to said second value:

for each SELECT box where a quantifier is of a type designated as existential or universal, setting said iterator attribute to said third value;

for each SELECT box where said body attribute has said first value or said third value, for each iterator in said SELECT box, setting said iterator attribute to said third value;

for each SELECT box, where all iterators ranging over said box have said iterator attribute set to said third value, setting said body attribute to said third value;

(e) merging each lower box into an upper SELECT box having a setformer ranging over said lower SELECT box and said head attribute of said upper SELECT box has said first value;

(f) merging each lower box into an upper SELECT box having a setformer ranging over said lower SELECT box and said body attribute of said upper SELECT box has said third value;

(g) merging each lower box into an upper SELECT box having a setformer ranging over said lower SELECT box and said body attribute of said lower SELECT box does not have said first value;

(h) for each of said merged boxes, if said body attribute of said former lower box had said first value and said body attribute of said upper SELECT box does not have said third value, setting said body attribute of said upper SELECT box to said first value;

(i) for SELECT boxes where said head attribute has said second value and said key column of said table is not present in the output, adding a unique identifier to said head and setting said head attribute to said first value.

9. The method of claim 8 further comprising the step of:

repeating steps (d) through (i) until the performance of these steps does not produce a change in said query.

10. The method of claim 8 further comprising the step of:

for all SELECT boxes having an existential quantifier forming a Boolean factor where said SELECT box head attribute has said first value, or said SELECT box body attribute has said third value;

or for said existential quantifier in said SELECT box, at most one tuple of the table ranged over by said existential quantifier satisfies a set of predicates in said SELECT box, or a key of the table ranged over by said quantifier appears in said head, setting said existential quantifier to be a setformer type.

11. The method of claim 10 further comprising the step of:

for each SELECT box having said existential quantifier set to a setformer type, more than one tuple of the table ranged over by said setformer box satisfies a set of predicates in said select box, and said setformer box head attribute has said first value, setting said body attribute to said first value.

12. The method of claim 11 further comprising the step of:

for each SELECT boxes having a setformer accessible by a set of predicates and said body attribute has said first value wherein for said setformer in said SELECT box, more than one tuple of the table ranged over by said SELECT box iterator satisfies a set of predicates in said SELECT box, converting said setformer to an existential quantifier; and eliminating all columns from said head box that refer to said quantifier.

13. The method of claim 12 further comprising the step of:

for each SELECT boxes having a setformer accessible by a set of predicates and said body attribute has said first value wherein for said setformer in said SELECT box, and no key of the table ranched over by said setformer appears in said head, converting said setformer to an existential quantifier; and eliminating all columns from said head box that refer to said quantifier.

14. The method of claim 13 further comprising the step of:

for each SELECT boxes having a setformer accessible by a set of predicates and said body attribute has said first value and for each iterator in said SELECT box, wherein none of the columns of said setformer are used in later steps, converting said setformer to an existential quantifier; and eliminating all columns from said header that refer to said quantifier.

15. The method of claim 14 further comprising the step of:
> for each SELECT boxes having a setformer accessible by a set of predicates and said body attribute has said first value and for each iterator in said SELECT box, wherein columns of said quantifier are only accessed by the header with expressions only referring to said columns, and no user of said header refers to these columns,
>
> converting said setformer to an existential quantifier; and
>
> eliminating all columns from said header that refer to said quantifier.

16. The method of claim 15 further comprising the step of:
> for each SELECT box having an existential single quantifier where there are an even number of NOTs between the predicate associated with said quantifier and the root of the associated Boolean factor, and for each evaluation of said subquery, at most one tuple is produced, converting the quantifier to being labeled existential.

17. In a relational database management system using a data processor for storing data in the form of a plurality of tables comprised of a plurality of tuples having one or more columns of predicates, and having key columns for unique identification of the tuples and wherein the data is retrievable by means of SQL queries which include at least one subquery, a system for processing a query, comprising:
> means for merging subqueries with queries when all of the tuples in the query output table will be distinct;
>
> means for merging subqueries with queries when an arbitrary number of duplicates are allowed to be present in the query output table;
>
> means for merging subqueries with queries when the subquery does not require that the ruffles in the subquery output table be distinct;
>
> means for eliminating duplicate tuples from the query output table of merged queries where the operation performed by the query does not effect duplicate elimination; and
>
> means for adding a unique identifier to each tuple in the query output table for queries where duplicates may be in the query output table.

18. The system of claim 17 further comprising:
> means for eliminating duplicate tuples during sort operations; and
>
> means for eliminating duplicate tuples using a duplicate filter.

* * * * *

UNITED STATES PATENT AND TRADEMARK OFFICE
CERTIFICATE OF CORRECTION

PATENT NO. : 5,367,675
DATED : November 22, 1994
INVENTOR(S) : Cheng et al.

It is certified that error appears in the above-indentified patent and that said Letters Patent is hereby corrected as shown below:

Column 22, line 52, delete "ranched", insert-- ranged--.

Column 24, line 12, delete "ruffles", insert--tuples--.

Signed and Sealed this

Thirty-first Day of October 1995

Attest:

BRUCE LEHMAN

*Attesting Officer*     *Commissioner of Patents and Trademarks*